US010497214B2

(12) United States Patent
Boothe et al.

(10) Patent No.: US 10,497,214 B2
(45) Date of Patent: Dec. 3, 2019

(54) MULTI-JURISDICTIONAL PROGRESSIVE FAST PLAY LOTTERY GAMES WITH POOL REPLENISHMENT AND ASSOCIATED METHODS

(71) Applicant: Intralot, Inc., Duluth, GA (US)

(72) Inventors: Byron Boothe, Georgetown, KY (US); Scott R. Hoss, Cumming, GA (US)

(73) Assignee: Intralot, Inc., Duluth, GA (US)

( * ) Notice: Subject to any disclaimer, the term of this patent is extended or adjusted under 35 U.S.C. 154(b) by 44 days.

(21) Appl. No.: 15/612,299

(22) Filed: Jun. 2, 2017

(65) Prior Publication Data

US 2017/0323526 A1 Nov. 9, 2017

Related U.S. Application Data

(63) Continuation-in-part of application No. 14/966,062, filed on Dec. 11, 2015, now abandoned, which is a
(Continued)

(51) Int. Cl.
*A63F 9/24* (2006.01)
*A63F 13/00* (2014.01)
(Continued)

(52) U.S. Cl.
CPC .......... *G07F 17/3258* (2013.01); *G06Q 30/00* (2013.01); *G06Q 40/00* (2013.01); *G07F 17/3225* (2013.01); *G07F 17/329* (2013.01)

(58) Field of Classification Search
CPC .................. G07F 17/329; G07F 17/3258
See application file for complete search history.

(56) References Cited

U.S. PATENT DOCUMENTS 8,210,921 B1 7/2012 Karpe
2003/0069059 A1* 4/2003 Stanek .................... A63F 3/081
463/17
(Continued)

OTHER PUBLICATIONS

International Preliminary Examining Authority; Notification of Transmittal of International Preliminary Report on Patentability; PCT/US14/61488; dated Oct. 16, 2015; 8 pgs.
(Continued)

*Primary Examiner* — Milap Shah
*Assistant Examiner* — Jason Pinheiro
(74) *Attorney, Agent, or Firm* — Wood Herron & Evans LLP

(57) ABSTRACT

A multi-jurisdictional master controller evaluates lottery data associated with each ticket purchased in each of the different jurisdictions as provided by each corresponding state server associated with each corresponding jurisdiction. A common jackpot is determined after each lottery ticket is purchased for the multi-jurisdictional lottery game that is accumulated from a percentage of each lottery ticket purchased. Each different jurisdiction is monitored to determine when a winning lottery ticket is identified in any of the different jurisdictions. Each state server associated with each different jurisdiction is notified of an updated common jackpot after each period of time expires based on the lottery tickets purchased in each of the different jurisdictions during the period of time. Each state server is notified when the winning lottery ticket is identified in any of the different jurisdictions during the period of time, thereby resetting the common jackpot to a minimum jackpot amount.

18 Claims, 6 Drawing Sheets

Related U.S. Application Data continuation of application No. PCT/US2014/061488, filed on Oct. 21, 2014.

(60) Provisional application No. 62/345,063, filed on Jun. 3, 2016, provisional application No. 61/893,483, filed on Oct. 21, 2013.

(51) Int. Cl.
| | | |
|---|---|---|
| *G06F 17/00* | (2019.01) | |
| *G06F 19/00* | (2018.01) | |
| *G07F 17/32* | (2006.01) | |
| *G06Q 40/00* | (2012.01) | |
| *G06Q 30/00* | (2012.01) | |

(56) References Cited

U.S. PATENT DOCUMENTS

| | | |
|---|---|---|
| 2003/0148805 A1 | 8/2003 | Hughes |
| 2005/0176490 A1* | 8/2005 | Wright ............... G06Q 20/045 463/17 |
| 2005/0215306 A1 | 9/2005 | O'Donnell et al. |
| 2005/0227759 A1 | 10/2005 | Dolezal |
| 2007/0235927 A1 | 10/2007 | Wright |
| 2009/0143128 A1 | 6/2009 | Cautley et al. |
| 2010/0160022 A1 | 6/2010 | Oram |
| 2011/0281637 A1 | 11/2011 | Meyer |
| 2012/0054096 A1 | 3/2012 | Burega et al. |
| 2013/0012288 A1 | 1/2013 | Nordby et al. |
| 2013/0084966 A1* | 4/2013 | Nicely ............... G07F 17/3258 463/27 |
| 2013/0260857 A1 | 10/2013 | Nordby et al. |
| 2014/0235313 A1 | 8/2014 | Napolitano |

OTHER PUBLICATIONS

European Patent Office, Supplemental Search Repot and Opinion, EP 14856030, dated Jun. 13, 2017, 11 pgs.

* cited by examiner

MULTI-JURISDICTIONAL PROGRESSIVE FAST PLAY LOTTERY GAMES WITH POOL REPLENISHMENT AND ASSOCIATED METHODS

CROSS REFERENCE TO RELATED APPLICATIONS

This claims the benefit of U.S. Provisional Application Ser. No. 62/345,063, filed Jun. 3, 2016 and is a continuation in part of U.S. patent application Ser. No. 14/966,062, filed Dec. 11, 2015 which is a continuation of PCT Application No. PCT/US2014/061488, filed on Oct. 21, 2014 which claims the benefit of U.S. Provisional Patent Application Ser. No. 61/893,483, filed on Oct. 21, 2013, and each of these prior applications is herein incorporated by reference in its entirety.

BACKGROUND OF THE INVENTION

This invention relates to lotteries and, more particularly, to a multi-jurisdictional progressive fast play lottery game and associated methods of conducting such lottery games.

Lotteries have existed in various forms throughout the world for hundreds of years. Typical modern lottery formats often involve the selection by a customer or entrant of a pre-determined quantity of lottery numbers (e.g., from a range of numbers) such as by writing such numbers down on a paper form which is submitted to a store clerk. Once the lottery ticket is paid for, such numbers are then entered into a machine which prints, on a second piece of paper, a lottery ticket which is issued to the lottery customer. Lottery winners in such conventional lotteries are eventually chosen by a lottery administrator which—via one or more conventional methods—draws or randomly selects winning numbers which an entrant must have selected, and thereby have a paper ticket with numbers matching the winning numbers, to win the lottery prize. If the paper lottery ticket is lost, the contestant—even if he or she were a winner—would be unable to collect his/her prize. Because the contestant is able to choose whatever numbers he or she desires in such lotteries, multiple winners are possible which necessitates prize sharing. Conversely, because there is no guarantee that the numbers drawn will precisely match any set of numbers chosen by a lottery contestant, a given lottery draw may result in no winner at all.

In a popular second type of lottery format, paper tickets are sold to lottery customers which are a scratch-off type or a variety of so-called instant win tickets. With such a lottery ticket, often the ticket is predetermined as either a winner or a loser and the customer discovers the "result" of the ticket by scratching or rubbing off an opaque film which conceals whether the ticket is a winning or losing ticket. Because of the simplicity of their design and implementation, there are often a large variety of scratch-off lottery ticket types which compete with one another.

As most conventional lottery types employ paper tickets, not only does the printing of massive numbers of throw away tickets have an environmental impact, but it also requires substantial financial expenditure by the lottery provider to design, print, store, and ship the tickets to large numbers of geographically distant locations.

The popularity of lotteries in recent years has declined despite the social benefits such as providing entertainment and sources for civic funding of schools and other institutions. The decline is possibly due to a lack of excitement or enthusiasm associated with conventional lotteries. In this regard, the public has arguably become sensitized to the conventional lottery formats and therefore does not participate in such lotteries as frequently.

Therefore, needs exist in the lottery industry including, for example, a need for new lottery game types which elicit greater participation by lottery contestants. As other examples, there is a need for lottery (or game) types with reduced environmental impact and/or which are less expensive and cumbersome to administer. However, barriers exist for new types of lottery games. State lotteries are offered on a large scale, and are operated using centralized transaction processing systems to collect and/or redeem wagers. Most state lotteries and similar entities operate their own central host system, or have it operated by a contractor. The host systems are typically located within the jurisdiction of the lottery provider. The state lotteries also deploy their own client equipment to operate various channels for delivering games to player customers, such as agent-operated lottery game sales terminals, unattended lottery game sales terminals, vending machines, kiosks, electronic access via the Internet from personal computers, mobile phone access, and interactive TV terminal access, etc. They also operate, or have operated on their behalf by a contractor, their own customized administration systems, such as accounting, reporting, fraud control, prize redemption systems, etc.

Deploying new games on state lottery systems or in other gaming operations typically requires significant custom programming and the rollout of new features in all the various customized administration systems. This can take large amounts of time and resources. When a lottery has a successful new game, other lotteries want to emulate the game, which then requires additional custom work.

Generally, when the same game is offered in multiple jurisdictions, each jurisdiction has its own implementation (often with variations to the business rules or play style). Even for multi-jurisdictional games like Powerball®, each participating jurisdiction has its own instance of the game and the process of determining winners for the shared jackpot is done separately in each jurisdiction—often with "low tech" exchange of data like fax or email for winning numbers, share values, etc.

Another aspect of existing lottery games is the approach by which the lottery authority replenishes the pool of available lottery numbers or selections after each lottery ticket is purchased. As discussed in U.S. Patent Application Publication No. 2014/0235313, which is hereby incorporated by reference in its entirety, instant games are predetermined games of chance. In other words, the outcome is determined at the point of purchase and typically revealed in the form of an interactive, animated sequence. None of the player's decisions or actions has any impact on the outcome of the game. Electronic instant tickets can be distributed just like traditional paper-based instant tickets, where a pool of tickets is created and one-by-one that pool is diminished (i.e., a "dynamic" grid). Alternatively, and based purely on statistical odds, a pool of tickets is created and there are no changes to the pool as tickets are sold (i.e., a "static" grid). Dynamic grids include, for example, top tier replenishment, top tier replacement, and grid sell-out replacement. In any case, a random number generator (RNG) determines the outcome according to the probabilities defined for the game.

Lottery operators often publish the player's odds of winning such an instant lottery game. Once the pool of instant game tickets is initially established, the odds of winning are likewise set. However, as players purchase tickets from the pool, the odds of subsequent players winning may not be the same as those initially set because an inordinate number of winning, or losing, tickets may be randomly sold during the earlier stages of the ticket sales for that particular game. Therefore, the percentage of winning tickets remaining in the pool after prior ticket sales may be different, higher or lower, than those set by the lottery authority. This is particularly true in a static grid approach as discussed above.

In a multi-jurisdictional setting, the individual jurisdictions currently implement their own specific approaches to the replenishment of the pool of tickets in games which apply to the multi-jurisdictional game thereby making the odds of an individual playing in one jurisdiction likely different from the odds of another player in a different jurisdiction even though both players are seeking the same jackpot.

In view of the above-enumerated drawbacks and/or needs or desires for improvements in the lottery industry, one purpose of the herein described invention is to address one or more of such drawbacks and/or desires as well as, or in the alternative, other needs which will become more apparent to the skilled artisan based on this disclosure.

SUMMARY OF THE INVENTION

In various embodiments, this invention is directed to a method of conducting a multi-jurisdictional lottery game in which a jackpot for the multi-jurisdictional lottery game is maintained. A minimum jackpot amount for the multi-jurisdictional game is established. The method also includes coordination with a number of jurisdictions regarding a number of individual jurisdictional lottery games each being conducted within one of the jurisdictions in which lottery players each participate in one of the individual jurisdictional lotteries by purchasing a lottery chance at a lottery game price. A portion of the lottery game price for each lottery chance purchased by each of the plurality of lottery players is contributed to the multi-jurisdictional lottery game jackpot. Periodically and typically on a regularly scheduled interval, an updated jackpot amount is communicated to each of the jurisdictions.

A notification may be issued from at least one of the jurisdictions that a potential winning jackpot player has won the multi-jurisdictional lottery game. The multi-jurisdictional lottery game, in the form of a master controller in one embodiment, then verifies that the potential winning jackpot player has won the multi-jurisdictional lottery game. Each of the jurisdictions is then notified that the multi-jurisdictional lottery game has been won if the verification indicates as such. Once the jackpot is won, it is then re-established at the minimum jackpot amount and a new game may commence.

If more than one notification is received that the jackpot has been won, the master controller may determine which of the players claiming the jackpot is entitled to it, and in one embodiment of this invention the first potential winning player to claim the jackpot is awarded the jackpot.

In other embodiments, this invention may be directed toward a method of playing a lottery game, a lottery game implemented by one or more game terminals in communication with a server via a communication network, a system for hosting a lottery game across multiple jurisdictions, a program product embodied in one or more tangible computer readable media with a code executable by a gaming machine and a gaming server, a tangible non-transitory computer readable medium storing a program product which includes computer executable program code, a method for implementing a network-based lottery game and a gaming apparatus or system for a multi-jurisdictional lottery game.

In still further embodiments, each jurisdiction participating in the multi-jurisdictional game utilizes a dynamic grid approach to the replenishment of tickets in the respective jurisdiction's pool of tickets. In this manner, even though the specific games in different jurisdictions may be different from one another, those specific games are each participate in the multi-jurisdictional game. Moreover, the respective lottery authorities each employ a dynamic grid approach to the replenishment of tickets in their respective ticket pools thereby affording all of the players in the multi-jurisdictional game the same odds of winning regardless of the jurisdiction or when their ticket is purchased.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
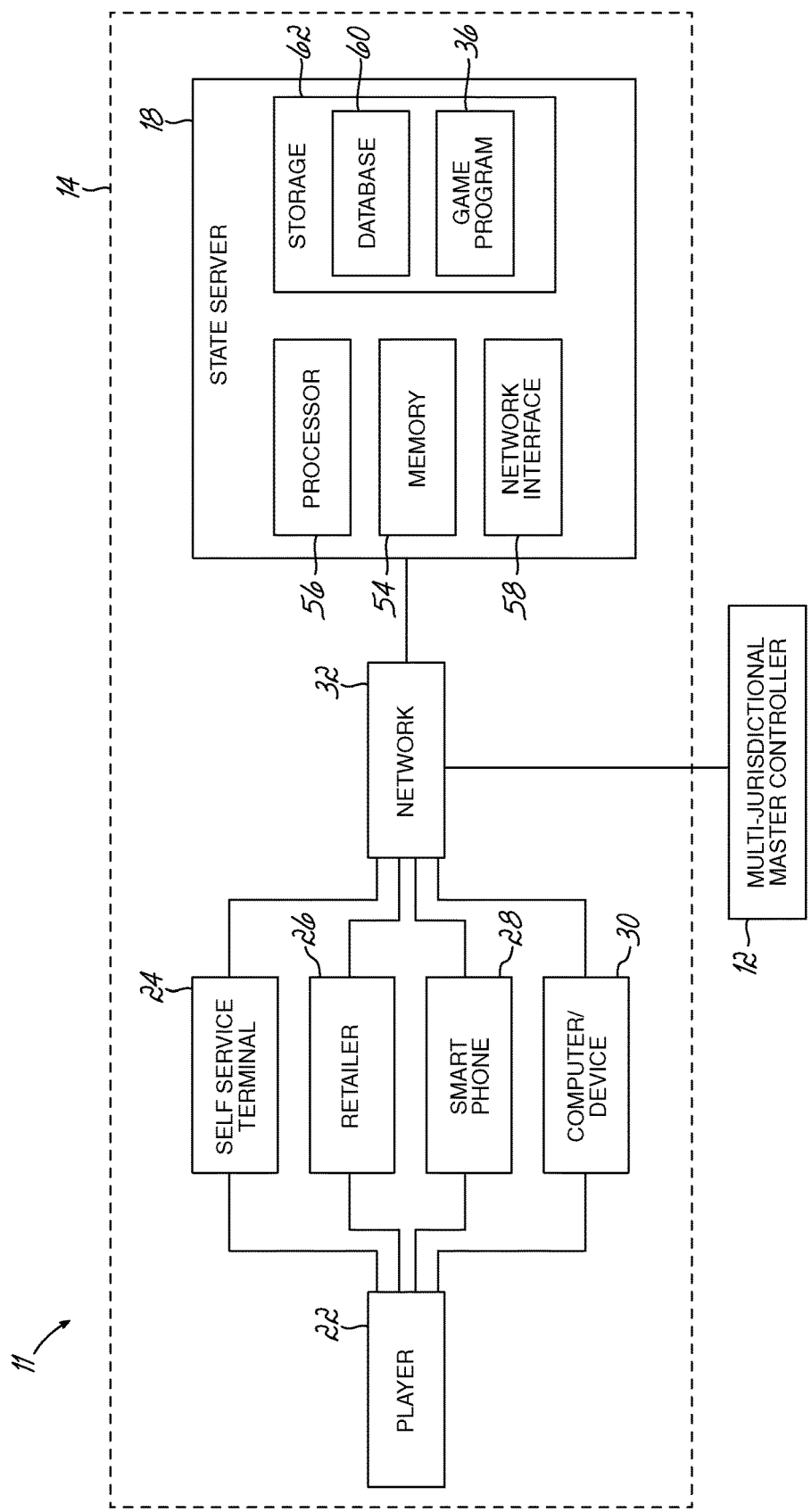
FIG. 1 is a schematic representation of how a player may engage a state or local jurisdiction lottery system according to one aspect of this invention.

Embodiments of the disclosure generally relate to the coordination of a multi-jurisdictional lottery game. In an example embodiment, a multi-jurisdictional controller is a centralized controller that manages different lottery games with each lottery game associated with a different jurisdiction. However, each of the different jurisdictions sell lottery tickets to participants within their jurisdictions that participate in lottery games within their jurisdiction that are common with the lottery games of other jurisdictions. In such a case, each of the lottery games within individual jurisdictions that are in common with each other, share a single jackpot that is contributed to by each of the individual jurisdictions. For example, a percentage of each lottery ticket sold within each of the individual jurisdictions participating in the common lottery games is contributed to the single jackpot associated with the common lottery games.

The multi-jurisdictional controller receives data regarding the common lottery games from a state lottery server associated with each jurisdiction that participates in the common lottery games. Each of the state lottery servers may provide to the multi-jurisdictional controller data such as the quantity of lottery tickets sold by each corresponding jurisdiction. As participants within each individual jurisdiction purchase lottery tickets for the common lottery games, the multi-jurisdictional controller accumulates the data associated with each sale of each lottery ticket and determines the current jackpot for the common lottery games.

Popular lottery games with a common jackpot contributed to and shared by different jurisdictions may result in a high volume of lottery tickets being purchased in an on-going period of time thereby constantly increasing the common jackpot until a winner is declared. The multi-jurisdictional controller may continually accumulate the sale of lottery tickets by each jurisdiction and continually update the common jackpot amount. The multi-jurisdictional controller may do so in real-time such that the multi-jurisdictional controller may report back to the state lottery servers associated with each respective jurisdiction the common jackpot amount in real-time as well as a declared winner when such a declared winner occurs.

As noted above, popular lottery games with a common jackpot contributed to and shared by different jurisdictions may result in a high volume of lottery tickets being purchased in an on-going period of time thereby constantly increasing the common jackpot until a winning lottery ticket is declared. As the common jackpot increases significantly, participants in different participating jurisdictions may purchase lottery tickets under the impression that the common jackpot is significantly high and such a significantly high jackpot may motivate the participants to purchase the lottery tickets for the common lottery games. However, any delay in providing an updated common jackpot amount may result in confusion and disdain by participants who purchased a lottery ticket under the impression that the common jackpot amount was a specified high amount. However, in actuality a participant in another jurisdiction may have already purchased a winning lottery ticket that the other jurisdictions were unaware of thereby lowering the actual common jackpot amount significantly. Thus, the multi-jurisdictional controller may bring cohesion to common lottery games provided by different jurisdictions that share a common jackpot.

In the Detailed Description herein, references to "one embodiment", "an embodiment", an "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in the art to affect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

System Overview

Figure 2:
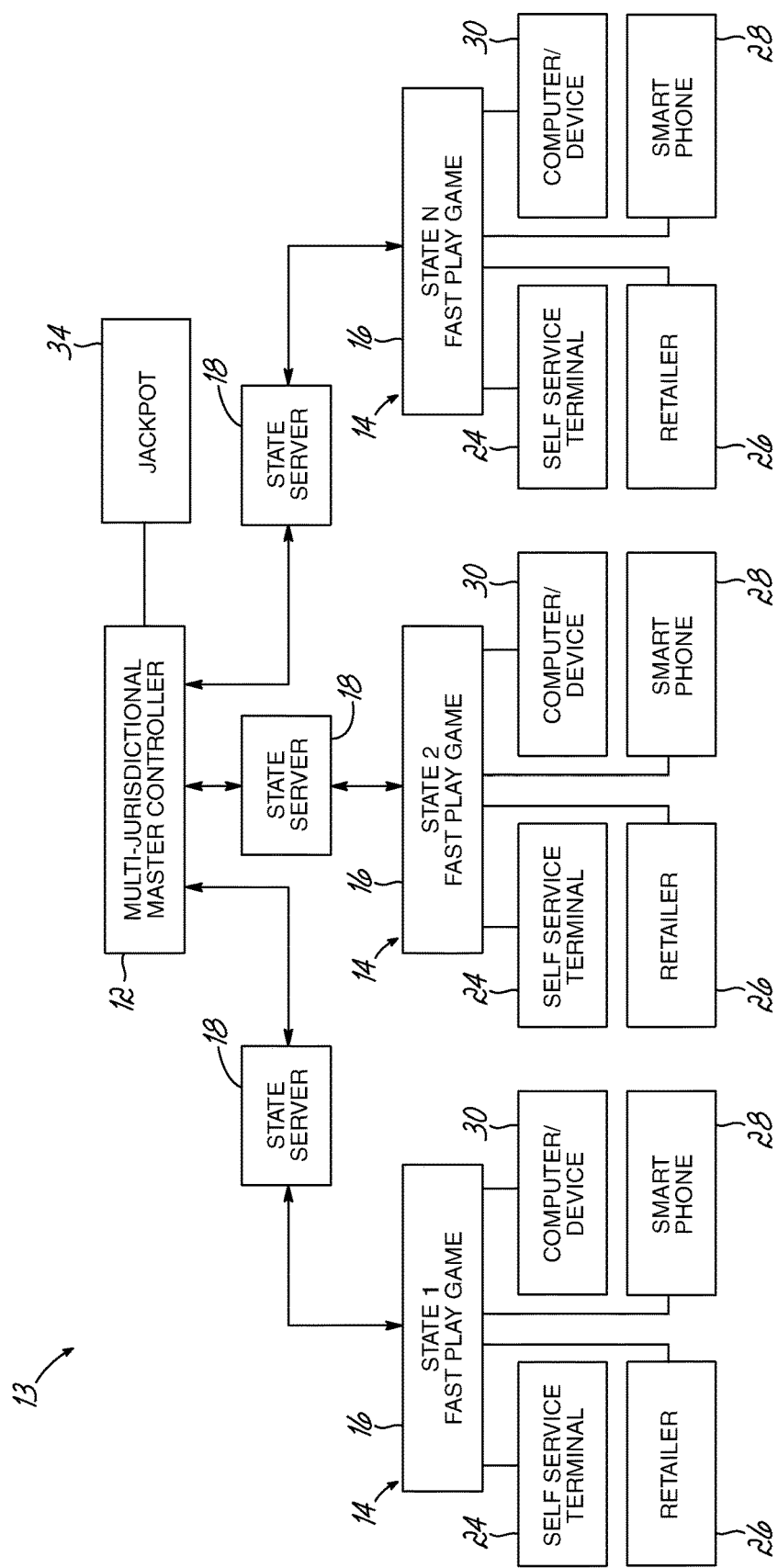
FIG. 2 is a schematic representation of the organization of a multi-jurisdictional lottery game network of one embodiment of this invention.

Referring to the drawings, and in particular FIG. 1, a multi-jurisdictional lottery configuration 11 according to various embodiments of this invention is operated by a multi-jurisdictional master controller 12. The master controller 12 is utilized to operate the multi-jurisdictional lottery game 16 across a number of distinct lottery jurisdictions 14, such as state lottery authorities in the US. As shown in FIG. 1, the multi-jurisdictional lottery configuration 11 may enable a multi-jurisdictional game 16 be played in multiple and distinct lottery jurisdictions 14 and this is represented in FIG. 2 by State 1, State 2 and up to any number of jurisdictions 14 as shown by State N. Each distinct jurisdiction 14 may employ a similar lottery game 16 or the various jurisdictions 14 may employ varied and different lottery games 16 from each of the other jurisdictional games. In various embodiments, the jurisdictional lottery games 16 are each fast play progressive games, examples of which are commonly known to those of ordinary skill in this art.

Each jurisdictional lottery game 16 may be conducted by a state lottery authority which may utilize a jurisdictional or state lottery server 18 to operate the jurisdictional game 16. One example of the organization and operation of a state or jurisdictional lottery game 16 is shown in FIG. 1. The arrangement shown in FIG. 1 may be utilized by any or all of the individual jurisdictions 14 State 1, State 2 through State N for operation of the respective jurisdictional lottery games 16. Alternatively, one or more jurisdictions 14 may use a different game architecture for operation of the associated jurisdictional game 16 according to various embodiments of this invention. Examples of the differences among the various jurisdictional lottery games that may be utilized within this invention include differing game themes, names, odds, payouts at the state level, prices, methods of conducting the game including, but not limited to, the generation of the random numbers for participation and/or winning at the state level or any other variable which may be utilized as known by those of skill in this art. While the jurisdictional games may be varied, each must include a common component for participation in the multi-jurisdictional game according to this invention.

Figure 4:
FIG. 4 is a view of an exemplary lottery ticket which may be used in one embodiment of a lottery game according to this invention.

Each jurisdictional lottery game 16 (FIG. 1) may include the sale of a lottery ticket 20, an example of which is shown in FIG. 4. The lottery ticket 20 is sold to a lottery player 22 by the respective state, jurisdiction, or lottery authority 14 for participation in the associated jurisdictional lottery game 16. The player 22 may utilize a self-service terminal 24, a lottery retailer 26, their own smart phone 28, a computer or other device 30 to purchase the ticket 20. Each of these devices 24, 26, 18, 30 is in communication with the state server 18 via a network 32 such as the internet or a dedicated communication network. Each lottery ticket 20 may entitle the lottery player 22 participation in the local jurisdictional lottery game 16 and participation in the multi-jurisdictional lottery game according aspects of this invention. The lottery ticket 20 may be issued in paper, electronic or another form as is well known. The local lottery authority charges a ticket price for the purchase of the lottery ticket 20 and participation in the jurisdictional 16 and/or multi-jurisdictional game. A portion of the ticket price is transmitted to the multi-jurisdictional master controller 12 for adding to the multi-jurisdictional jackpot 34. In one embodiment of this invention, while the individual jurisdictional games 16 conducted by the local lottery authorities State 1, State 2 through State N 14 may be varied, the contribution amount to the multi-jurisdictional jackpot for each purchased ticket 20 is the same across the various jurisdictions State 1, State 2 through State N 14 participating in the multi-jurisdictional game.

Each player 22 participating in a common lottery game provided by a jurisdiction may purchase a lottery ticket 20 to participate in the common lottery game via a lottery ticket purchase computing device. Examples of the lottery ticket purchase computing include a mobile phone, a smartphone 28, a workstation, a self-service terminal 24, a portable computing device, a retailer 26, other computing device such as a laptop, or a desktop computer, cluster of computers, computer/device 30, set-top box, and or any other suitable electronic device that will be apparent to those skilled in the relevant art(s) without departing from the spirit and scope of the invention.

In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

Each player 22 may participate in a lottery game that is supported by the jurisdiction 14 that the player 22 purchased the lottery ticket 20 to participate in the particular lottery game. A jurisdiction 14 may be a territory defined by a governing body that has rules and/or regulations with regard to the lottery game supported by the jurisdiction. For example, the jurisdiction may be a state, such as Ohio, located in the United States that has its own rules and/or regulations with regard to the lottery game supported by the state that the player 22 has purchased a lottery ticket 20 within.

Each player 22 may participate in the lottery game that is supported by the jurisdiction and/or make selections for the lottery game via the self-service terminal 24, retailer 26, smartphone 28, computer/device 30 and/or any other lottery ticket purchase computing device that will be apparent to those skilled in the relevant art(s) without departing from the spirit and scope of the invention. Each player 22 may purchase a lottery ticket 20 to participate in the lottery game via the lottery ticket purchase computing device. The lottery game that the player 22 participates within via the purchasing of the lottery ticket 20 may be specific to the jurisdiction that the player 22 is located within when purchasing the lottery ticket 20 and may be independent of lottery games supported by the rules and/or regulations of other jurisdictions. Lottery data associated with the lottery ticket 20 that the player 22 purchased to participate in the lottery game and/or selections selected by the player 22 for the lottery game may be provided to the state server 18 via the network 32 upon the purchase of the lottery ticket 20 by the player 22.

One or more lottery ticket purchase computing devices may engage one or more state servers 18. Examples of state server 18 may include a server, a mobile telephone, a smartphone, a workstation, a portable computing device, other computing devices such as a laptop, or a desktop computer, cluster of computers, set-top box, and or any other suitable electronic device that will be apparent to those skilled in the relevant art(s) without departing from the spirit and scope of the invention.

In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

The state server 18 may be a central gaming system associated with a corresponding jurisdiction 14 that provides the lottery game. Each time the player 22 purchases a lottery ticket 20 to participate in the lottery game, the state server 18 may accumulate lottery data associated with the lottery ticket 20 purchased by the player 22. The lottery data may be data that is associated with the lottery ticket 20 purchased by the player 22 that provides information associated with the lottery ticket 20 and/or the transaction in which the player 22 purchased the lottery ticket 20. For example, the lottery data may include but is not limited to the type of lottery game that the lottery ticket 20 is associated with, the date and/or time the lottery ticket 20 was purchased, the amount that the player 22 paid to purchase the lottery ticket 20, the selections of the lottery ticket 20, the details of the lottery ticket 20 that is to be determined as to whether the lottery ticket 20 is a winner, and/or any other information associated with the lottery ticket 20 and/or the transaction which the player 22 purchased the lottery ticket 20 that will be apparent to those skilled in the relevant art(s) without departing from the spirit and scope of the invention.

However, lottery games provided by individual jurisdictions 14 and/or supported by the rules and/or regulations of particular jurisdictions 14 may include similarities. For example, the lottery games provided by individual jurisdictions 14 may essentially have similar rules and/or objectives such that a player 22 that purchases a lottery ticket 20 for a lottery game in a first jurisdiction may essentially have the same rules and/or objectives of a player 22 that purchases a lottery ticket 20 for a lottery game in a second jurisdiction. Although the lottery game is provided and/or regulated by the corresponding individual jurisdiction 14 and is separate from the other similar lottery games provided and and/or regulated by the other corresponding individual jurisdictions, sufficient commonality between the lottery games may exist such that each of the individual jurisdictions 14 may pool their resources together to provide common lottery games that share the resources of each participating jurisdiction.

For example, different jurisdictions 14 may each contribute to a minimum jackpot as well as a percentage of each ticket sale to a common jackpot that is shared by each of the common lottery games supported by each of the corresponding jurisdictions. In doing so, the common jackpot contributed to and shared by each participating jurisdiction may be significantly higher than if each individual jurisdiction simply contributed to their own corresponding common jackpot. The appeal of an increased jackpot may then entice additional participants to purchase lottery tickets 20 for the common lottery games as compared to a significantly lower jackpot that is supported by a single jurisdiction thereby increasing the benefit of each participating jurisdiction 14 in supporting the common lottery games.

One or more state servers 18 may engage the multi-jurisdictional master controller 12. The multi-jurisdictional master controller 12 may be a centralized computing device that coordinates each of the lottery tickets 20 purchased by each of the players 22 in each of the participating jurisdictions 14 based on the lottery data provided by each of the state servers 18 associated with each of the participating jurisdictions 14. Examples of the multi-jurisdictional master controller 12 may include a server, a mobile telephone, a smartphone, a workstation, a portable computing device, other computing devices such as a laptop, or a desktop computer, cluster of computers, set-top box, and or any other suitable electronic device that will be apparent to those skilled in the relevant art(s) without departing from the spirit and scope of the invention.

In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

Although each of the common lottery games are provided and regulated by the corresponding jurisdiction 14 for each of the lottery games, multi-jurisdictional master controller 12 may provide to each participant that purchases lottery tickets 20 in each of the participating jurisdictions 14 the stigma that each participant is actually participating in a multi-jurisdictional game. In order to do so, the multi-jurisdictional master controller 12 may accumulate the lottery data associated with each purchased lottery ticket 20 in order to track each lottery ticket 20 purchased within each participating jurisdiction and to determine the common jackpot available to the common lottery games provided by each individual jurisdiction. With each lottery ticket 20 purchased despite the jurisdiction 14 that the lottery ticket 20 was purchased, the multi-jurisdictional master controller 12 may determine the common jackpot that is available to the common lottery games provided by each individual jurisdiction 14.

As noted above, the common jackpot may motivate additional participants to purchase lottery tickets 20 and/or motivate existing participants to purchase additional lottery tickets 20 to participate in the corresponding common lottery games provided by each individual jurisdiction. Thus, large quantities of lottery tickets 20 may be purchased in all of the participating jurisdictions 14 on an ongoing basis resulting in the common jackpot to continually increase before a winning lottery ticket 20 is declared. With such a dynamic and continuous update in the lottery tickets 20 purchased resulting in a continual increase in the common jackpot, the multi-jurisdictional master controller 12 may continually accumulate and determine the common jackpot as the multi-jurisdictional master controller 12 is provided with the lottery data associated with each purchased lottery ticket 20 by each of the state servers 18 associated with each corresponding jurisdiction.

Further, each individual jurisdiction may identify a winning lottery ticket 20 within their jurisdiction based on the rules of the common lottery games. Each time a winning lottery ticket 20 is selected, the common jackpot shared amongst participating jurisdictions may be reset to a minimum jackpot amount agreed upon by the participating jurisdictions. With participants purchasing large quantities of lottery tickets 20 in different jurisdictions on an on-going basis, a participating jurisdiction may identify a winning lottery ticket 20 thereby resetting the common jackpot amount to the minimum jackpot amount.

However, without the multi-jurisdictional master controller 12 also tracking the winning lottery tickets 20 selected in corresponding jurisdictions 14 and updating the remaining jurisdictions 14 that a winning lottery ticket 20 has been selected thereby resetting the common jackpot amount, participants may continue to purchase lottery tickets 20 under the impression that the common jackpot continues to be maintained at an increased amount as if a winning lottery ticket 20 has not already been declared. Thus, the multi-jurisdictional master controller 12 may also monitor winning lottery tickets 20 declared in corresponding jurisdictions and update each of the participating jurisdictions 14 that a winning lottery ticket 20 has been declared thereby resetting the common jackpot to the minimum jackpot amount.

As shown, the lottery ticket 20 purchase computing devices, the state servers 18, and the multi-jurisdictional master controller 12 streams lottery data via network 32. Network 32 includes one or more networks, such as the Internet. In some embodiments of the present invention, network 32 may include one or more wide area networks (WAN) or local area networks (LAN). Network 32 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 120 takes place using one or more network communication protocols including reliable streaming protocols such as transmission control protocol (TCP). These examples are illustrative and not intended to limit the present invention.

Multi-jurisdictional Master Controller

FIG. 2 depicts a multi-jurisdictional configuration 13 where the multi-jurisdictional master controller 12 manages the common lottery games 16 provided by each of the individual jurisdictions 14 with regard to the common jackpot 34. The multi-jurisdictional master controller 12 may continuously track each of the lottery tickets 20 purchased in each of the participating jurisdictions 14 as well as continuously determine the common jackpot 34 while monitoring the winning lottery tickets 20 determined in each of the participating jurisdictions 14. In doing so, the multi-jurisdictional master controller 12 may continuously update each of the state servers 18 as to the common jackpot 34 as well as any identified winning lottery tickets 20 to thereby provide to each participant the stigma that each participant is participating in a multi-jurisdictional lottery game.

Each time that a participant purchases a lottery ticket 20 regardless of the jurisdiction, the multi-jurisdictional master controller 12 may track the lottery data associated with the purchased lottery ticket 20. The corresponding state server 18 may provide to the multi-jurisdictional master controller 12 the lottery data associated with a purchased lottery ticket 20 within the jurisdiction 14 associated with the corresponding state server 18 each time a lottery ticket 20 is purchased. For example, each time a lottery ticket 20 is purchased in a participating jurisdiction 14, the multi-jurisdictional master controller 12 may track each lottery ticket 20 purchased in each jurisdiction 14 as provided by the corresponding state server 18. In doing so, the multi-jurisdictional master controller 12 may track the quantity of lottery tickets 20 purchased as well as the quantity of lottery tickets 20 purchased from each respective participating jurisdiction 14.

The multi-jurisdictional master controller 12 may then determine the common jackpot 34 based on each lottery ticket 20 purchased in each respective participating jurisdiction 14. The multi-jurisdictional master controller 12 may determine the common jackpot 34 based on the price of the lottery ticket 20 purchased and the percentage of each price that is contributed by the corresponding jurisdiction 14 to the common jackpot 34. The multi-jurisdiction master controller 12 may also determine the contribution of each participating jurisdiction 14 to the common jackpot 34 based on the quantity of lottery tickets 20 purchased within the corresponding jurisdiction 14 and the price of each lottery ticket 20 purchased within the corresponding jurisdiction 14 and the percentage of each price that is contributed by the corresponding jurisdiction 14 to the common jackpot 34.

The multi-jurisdictional master controller 12 may also determine a sequence of each purchased lottery ticket 20 in each participating jurisdiction 14 based on the lottery data provided by each corresponding state server 18 associated with each purchased lottery ticket 20. Each time a lottery ticket 20 is purchased within a participating jurisdiction 14, a time stamp as to the date and time that the lottery ticket 20 is purchased is provided to the multi-jurisdictional master controller 12 by the corresponding state server 18 associated with the jurisdiction 14 that the lottery ticket 20 is purchased within. The multi-jurisdictional master controller 12 may then sequence each purchased lottery ticket 20 from each participating jurisdiction 14 based on the date and time that the lottery ticket 20 is purchased. In such common lottery games 16, such as instant win games, the winning lottery ticket 20 purchased with a date and time before a later purchased winning lottery ticket 20 may be declared the winning lottery ticket 20. Thus, the multi-jurisdictional master controller 12 may sequence each purchased lottery ticket 20 based on the date and time each lottery ticket 20 is purchased.

The multi-jurisdictional master controller 12 may also track the winners of each common lottery game 16 as provided by the corresponding state servers 18. In doing so, the multi-jurisdictional master controller 12 may track the date and time of each winning lottery ticket 20 as well as the jurisdiction 14 that the winning lottery ticket 20 is purchased. Each jurisdiction 14 may determine a winner of the common lottery game 16 based on the lottery tickets 20 purchased within the corresponding jurisdiction 14. The corresponding state server 18 may then notify the multi-jurisdictional master controller 12 that a winning lottery ticket 20 has been identified in the jurisdiction 14 associated with the state server 18. Based on the date and time of the winning lottery ticket 20, the multi-jurisdictional master controller 12 may determine the amount of the common jackpot 34 as of the date and time of the winning lottery ticket 20. The amount of the common jackpot 34 as of the date and time of the winning lottery ticket 20 may be allocated to the participant of the winning lottery ticket 20. The multi-jurisdictional master controller 12 may also notify each of the other state servers 18 that winning lottery ticket 20 has been identified as well as resetting the common jackpot 34 to the minimum jackpot amount.

As noted above, the interest in participants purchasing lottery tickets 20 may greatly increase with the appeal of a significantly larger common jackpot 34 for the participants to potentially win. With such an increased interest of participants purchasing lottery tickets 20 in different jurisdictions 14, the multi-jurisdictional master controller 12 may continually track the lottery data associated with each purchased lottery ticket 14 as provided by each corresponding state server 18 as well as continually update the common jackpot 34 based on each lottery ticket 14 purchased. Numerous lottery tickets 14 may be purchased within a period of time with numerous lottery tickets 14 being purchased within several different jurisdictions 14.

For example, hundreds of lottery tickets 14 may be purchased in a given day within a single state as well as hundreds of lottery tickets 14 being purchased in several different other states. Without the multi-jurisdictional master controller 12 tracking the lottery data associated with the numerous lottery tickets 20 purchased in the several different jurisdictions 14, a lottery ticket 20 may be purchased in a jurisdiction 14 and may be a winning lottery ticket but is not identified as even being purchased let alone being identified as a winning lottery ticket. Thus, the multi-jurisdictional master controller 12 may continually track the lottery data associated with each of the numerous lottery tickets 20 purchased in several different jurisdictions 14 purchased within a period of time as provided by each corresponding state server 18 to ensure that each lottery ticket that is purchased is identified and the common jackpot 34 is updated accordingly.

The multi-jurisdictional master controller 12 may also update each of the state servers 18 as to the amount of the common jackpot 34 and whether a winning lottery ticket has been selected in near real-time. As noted above, numerous lottery tickets 20 may be purchased within several jurisdictions 14. With each lottery ticket 20 purchased, the common jackpot 34 may increase. Participants may be motivated to buy lottery tickets 20 and/or additional lottery tickets 20 as the common jackpot 34 increases. However, a failure to notify each of the state servers 18 that a winning lottery ticket has been selected in a different jurisdiction and that the common jackpot 34 has been reset to the minimum jackpot amount may result in participants continuing to purchase lottery tickets 20 and/or additional lottery tickets based on the impression that the common jackpot 34 continues to be maintained at a high amount when in actuality the common jackpot 34 has been reset to the minimum jackpot amount. Thus, the multi-jurisdictional master controller 12 may update each of the state servers 18 as to the amount of the common jackpot 34 whether a winning lottery ticket has been selected in near real-time.

For example, a common lottery game, such as an instant win game, may have a winning lottery ticket every 3.0 to 3.5 days which is a quick turnaround for a lottery game where the common jackpot 34 is reset to the minimum jackpot amount every 3.0 to 3.5 days. The amount of lottery tickets 20 purchased in the 3.0 to 3.5 day time period amongst several different jurisdictions 16 may be immense. Participants within each of the several different jurisdictions may be motivated to purchase lottery tickets 20 and/or additional lottery tickets 20 within the 3.0 to 3.5 day time period as the common jackpot 34 continues to increase within the 3.0 to 3.5 day time period. Without the multi-jurisdictional master controller 12 updating each of the state servers 18 as to the current amount of the common jackpot 34 as well as whether any winning lottery tickets have been selected in different jurisdictions, participants may continue to purchase lottery tickets 20 under the impression that the common jackpot 34 continues to be at a high amount.

Thus, the multi-jurisdictional master controller 12 may update each of the state servers 18 every 60 seconds as to the amount of the common jackpot 34 as well as whether a winning lottery ticket has been selected in a different jurisdiction 16 thereby resetting the common jackpot 34 to a minimum jackpot amount. Updating each of the state servers 18 every 60 seconds may enable the multi-jurisdictional master controller 12 to update each of the state servers 18 in near real-time thereby enabling participants to have an accurate outlook as to the amount of the common jackpot 34 at the time the participants purchase their lottery tickets 20. The multi-jurisdictional master controller 12 may update each of the state servers in any period of time that is adequate to provide participants in each of the participating jurisdictions 14 as to an accurate outlook of the amount of the common jackpot 34 at the time each of the participants attempt to purchase their lottery tickets 20 that will be apparent to those skilled in the relevant art(s) without departing from the spirit and scope of the invention.

In an embodiment, the common rules and/or regulations of the common lottery games agreed upon by each of the participating jurisdictions 16 may include as to how different participants are treated when multiple participants each have a winning lottery ticket within a period of time. As noted above, the multi-jurisdictional master controller 12 may identify the date and time that each lottery ticket 20 is purchased in any of the different jurisdictions 16 and sequence each of those lotter tickets 20 based on the date and time of purchase. However, as noted above, a period of time may exist where participants in a first jurisdiction 16 are unaware that a winning lottery ticket has already been identified in a second jurisdiction 16 at the time the participants in the first jurisdiction purchased their lottery tickets.

In such a situation, a participant in the first jurisdiction 16 may also have purchased a winning lottery ticket despite the winning lottery ticket already being selected in the second jurisdiction 16. The multi-jurisdictional master controller 12 may sequence the winning lottery ticket purchased in the second jurisdiction as having a date and time before the purchase of the winning lottery ticket in the first jurisdiction. Based on the sequence, the lottery ticket purchased in the second jurisdiction may be entitled to the amount of the common jackpot 34 that is significantly high and then the lottery ticket purchased in the first jurisdiction may be entitled to the minimum amount of the common jackpot 34 as the common jackpot 34 is reset following the winning lottery ticket purchased in the second jurisdiction 16.

However, in such a situation, the participant in the first jurisdiction 16 is unaware that the common jackpot 34 has been reset. The participating jurisdictions 16 may agree that in such an instance that both the participant in the first jurisdiction 16 and the participant in the second jurisdiction 16 be entitled to the significantly high common jackpot 34 despite the participant in the first jurisdiction 16 purchasing their lottery ticket 20 after the participant in the second jurisdiction 16.

Thus, each of the participating jurisdictions 16 also have an interest in the multi-jurisdictional master controller 12 providing updates as to the amount of the common jackpot 34 and whether any winning lottery tickets have been selected in near real-time to avoid a situation where multiple participants purchased winning lottery tickets before each of the state servers 18 have been updated as to a winning lottery ticket being selected in a different jurisdiction 16. For example, the multi-jurisdictional master controller 12 updating each of the state servers 18 and as to the amount of the common jackpot 34 and whether any winning lottery tickets have been selected every 60 seconds significantly decreases the likelihood that multiple different participants may purchase winning lottery tickets within the 60 second time period thereby requiring the participating jurisdictions 16 to pay each of the participants with winning lottery tickets the significantly high common jackpot 34.

The master controller 12 maintains a running total of the multi-jurisdictional jackpot 34 and, according to one embodiment of this invention, updates each local jurisdiction State 1, State 2 through State N 14 on a regular and predetermined schedule the amount of the jackpot 34. For example, the master controller 12 may update the local jurisdictions 14 every two minutes with the current jackpot 34 amount. The local lottery authorities or jurisdictions 14 then may transmit the latest multi-jurisdictional jackpot 34 information to the lottery players 22 and/or prospective players.

The multi-jurisdictional lottery game may be won by any participating player 22 in any of the participating jurisdictions State 1, State 2 through State N 14. However, each jackpot 34 of the multi-jurisdictional game may be won by only one participating player 22 and the determination is made by the master controller 12 should more than one player 22 claim the jackpot 34. In one embodiment, the master controller 12 fields inquiries and claims from each jurisdiction 14 in which a player 22 claims to have won the jackpot 34. The master controller 12 then verifies the winner and determines which of the possible claimants was the first in time to claim the jackpot 34 with a winning lottery ticket. In the highly unlikely event that two potential winners submit their claim to the master controller 12 at exactly the same instance, then the master controller 12 will award the jackpot to one of the claimants, divide the jackpot among the claimants and/or another course of action as prescribed by the rules of the multi-jurisdictional game. After the jackpot 34 is awarded to the winning player, then the master controller re-sets the jackpot 34 to the minimum amount and another multi-jurisdictional game begins anew as previously described.

According to various aspects of this invention, each state or jurisdiction 14 has its own core fast play (FP) game engine or program 36 like any other traditional FP game. Typically, fast play games 16 are instant-style games that are played through a lottery terminal 24 or other device. Instead of filling out a bet-slip, a player 22 obtains a ticket 20 from a lottery retailer 26 for a fast play game. Alternatively, fast play game tickets 20 can be purchased by the player 22 through the lottery terminal 24 or other device 28, 30. One aspect of a fast play game is that a play slip does not need to be filled out and the player 22 does not need to select numbers to be played. Also, the player 22 does not need to wait for a drawing to determine if they are a winner. In certain aspects, fast play games are similar to the well known scratch-off ticket games, but no scratching is required in many fast play games. The numbers or symbols on the fast play ticket are compared to the winning numbers/symbols to determine a winner. The player's numbers and the winning numbers are often determined via a random number generator (RNG) or other method. A lottery agent or retailer may scan or otherwise check a player's ticket 20 to determine if it is a winning ticket. The variables of each FP game according to various embodiments of this invention can be different from state to state or jurisdiction to jurisdiction. Such variables may include different bitmaps or game designations or logos, random number generator (RNG) or pool based generation of the numbers/symbols, and different tiers and dividends from game to game, state to state or jurisdiction to jurisdiction.

In one embodiment of this invention, the FP game may have different tiers and the odds of winning a first tier are the same, but other tiers can have different odds, and the price point may be the same so that the percentage of the ticket price or cost for playing to be contributed to the jackpot 34 will be the same per play according to one aspect of this invention.

Example Applications of the Multi-Jurisdictional Master Controller

Figure 3:
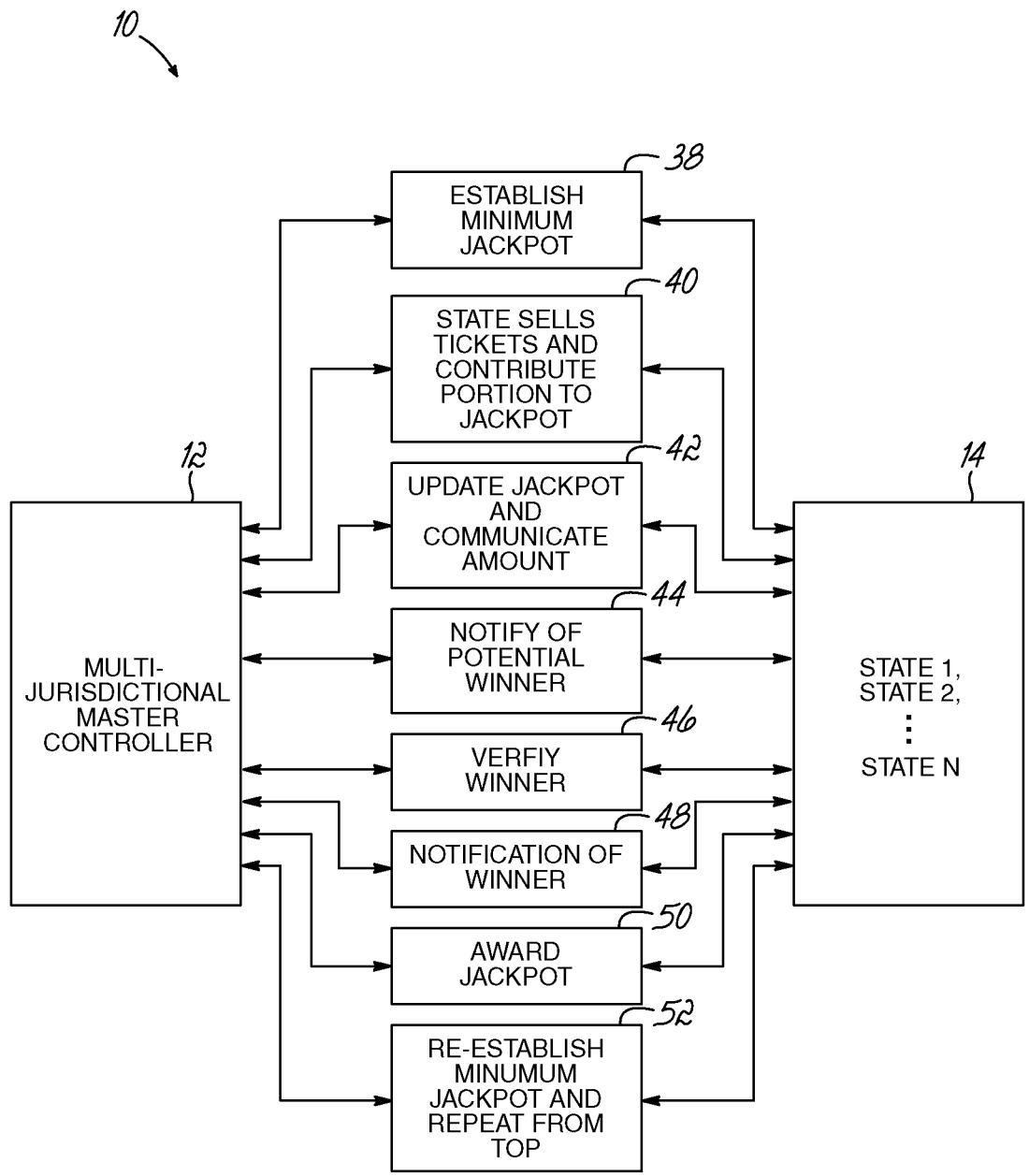
FIG. 3 is a schematic flow chart of the operation of a multi-jurisdictional lottery game of one embodiment of this invention.

Referring to FIG. 3, the game according to one aspect of this invention includes a master multi-jurisdictional master controller 12 which may be provided that will support the calculation of the jackpot 34, the notification of the current jackpot on a pre-defined, regular interval, for example every two minutes or more, and the election of the jackpot winner or winners in case of multiple concurrent winners across different states or jurisdictions 14. The game starts with a minimum jackpot established 38.

Upon every lottery play transaction 40 according to aspects of this invention, the local jurisdiction or state system 14 will make an application programming interface (API) call that will notify the master controller 12 of the dollar amount (based on cents) of the ticket value played. The master multi-jurisdictional master controller 12 will update the current jackpot 34 upon every such transaction.

At each interval, (i.e., every 2 minutes or more), the master controller 12 will update and propagate 42 back to all of the individual states or jurisdictions 14 that participate in the game the currently active current jackpot 34 amount. It is then the responsibility of each state authority 14 to propagate that information to their respective points of sale (POS) and associated lottery players 22.

The election of the jackpot winner across the multi-jurisdictional play is another aspect of this invention. At any point of time that the local state lottery 14 based on the RNG or from the pool file, have a jackpot winner (potential) instead of replying instantly back to the terminal 24 or other device, it will send that information 44 to the master system controller 12. According to aspects of this invention, the implementation across multiple states or jurisdictions 14 can result in more than one potential jackpot winner at the same second, so the master controller 12 will nominate which specific state ticket/player among the potential winners is actually the winner (based on a first in, first out (FIFO) algorithm). So the first ticket will be the winner and will get the jackpot amount according to one aspect of this invention. The master controller 12 will verify the winner 46 and propagate to all local lottery authorities 14 the identity of the winner 48, and the jackpot will then be awarded to the winner 50 and revert back 52 to the minimum jackpot amount. The notification of the winner 48 will be instantaneous and not dependent upon a chosen time interval in this case.

In still further embodiments, each jurisdiction participating in the multi-jurisdictional game utilizes a dynamic grid approach to the replenishment of tickets in the respective jurisdiction's pool of tickets. In this manner, even though the specific games in different jurisdictions may be different from one another, those specific games are each participate in the multi-jurisdictional game. Moreover, the respective lottery authorities each employ a dynamic grid approach to the replenishment of tickets in their respective ticket pools thereby affording all of the players in the multi-jurisdictional game the same odds of winning regardless of the jurisdiction or when their ticket is purchased.

In one exemplary embodiment, fast play tickets are drawn from a pool of 240,000 tickets. The drawn ticket is randomly chosen from the pool. All the possible combinations that give winning and non-winning tickets are stored in the pool. Tickets are sorted in the pool in a way that it follows the percentage of winners and non-winners described in the lottery authority's game specification. Each time a ticket is drawn from the pool, the odds of being a winner in a specific winner category or a non-winner equals the percentages specified in the prize structure table of each game.

A game prize structure is created that determines the number of tickets and defines each winning category along with the number of wins per winning tier. The remaining tickets in the pool are non-winners.

As an example in the case of a winning ticket of $100, the lottery authority programs the game so that there are no other wins of any amount on that ticket. The exact set of cards comprising the total and the winning ticket can vary and are selected by a random number generator (RNG), but are not predetermined for the $100 winning tier. This allows for variations in winning scenarios at each prize level. The same holds true for non-winning tickets. All of the possible winning and non-winning scenarios are programmed adhering to the rules for each tier based on the prize structure. An exemplary game may proceed as follows:
1. Game begins sales and the first ticket is sold.
2. RNG selects the tier (win or lose).
3. The ticket that was just sold is replaced by a ticket of the same winning or non-winning tier (i.e., dynamic grid).
4. The next play has the exact same odds of winning at all tiers as the first ticket sold. The same is true for all tickets sold in each of the jurisdictions participating in the multi-jurisdictional game, regardless of the differences in those games from jurisdiction to jurisdiction.

Suitable examples of gaming devices of this invention which may be specialized and adapted for this invention include video lottery terminals, virtual lottery draw machines, slot machines, video poker machines, digital roulette machines, hand-held cell phones or other personal digital assistants, web sites, POS TV monitors, touch-screens and others. Conceptual principles of a system for implementing a network-based lottery game wherein players are given access to a network game site for play of a lottery game having a predetermined outcome according to various embodiments of this invention include the following. It should be understood that this invention, system and associated methods are not limited by any particular type of game, and the term "lottery game" is used herein to denote any type of probability-based game offered to eligible persons. The games may be presented to players purely for entertainment value at no cost to the player. Prizes may be awarded to a player for a winning game play, which may include a cash award. In other embodiments, the player places a wager amount for play of the lottery game in the hopes of winning a cash award or other type of prize.

The game may be administered by a lottery provider, which is the entity that provides a lottery to a gaming authority or administrator. In an alternate embodiment, the lottery provider and gaming authority may be the same entity. The gaming authority may be, for example, a state or other regional governmental entity that provides lottery games to eligible players via authorized retailers or retail establishments. In the United States, for example, the gaming authority may be a state or affiliation of states that offers lottery games to their residents via the sale of lottery games at authorized retail establishments.

The gaming authority typically utilizes a central host computer system in communication with the various retail establishments, particularly the lottery terminals maintained at the retail establishments (also referred to as point-of-sale terminals) one example of which is shown in FIG. 1. Typically, a vast number of such terminals are operatively coupled to the central host computer system via any suitable communications network 32, which may be, for example, the Internet, a wide area network (WAN), a local area network (LAN), a telephone system, and so forth. In a particular embodiment, the lottery network may include a state lottery system operating within an individual state or region of states, wherein the lottery terminals 24 are interconnected to the game administrator and host computer server 18 directly or through an intermediary network for tracking, administration, and coordination of the state lottery system, including control of issued tickets, prizes, amounts wagered, and so forth. It should be readily appreciated that this invention encompasses any suitable communications network architecture that provides the lottery player with the ability to communicate and interact with the game administrator's central host computer system 18.

The point-of-sale terminals 24 or other gaming device 26, 28, 30 may include any conventional feature known to those skilled in the art related to lottery terminals. The terminal includes features and functionality to allow a player or retail clerk to enter the information required to participate in the lottery game. An exemplary terminal includes a housing, one or more input devices, which may be a control panel having input keys, a display, a value input device such as a card reader, a play slip or ticket reader, and a ticket printer. The play slip reader is typically configured to read user selection marks, bar codes, magnetically stored information, or any other desired input information and may be omitted in various embodiments. Control panel input keys allow the player or retail clerk to select the game to be played, input the value to be wagered, manually enter selected lottery characters (if needed), and input any other information necessary to play the lottery game. The terminal may include a display which may be an LCD, a CRT, or touch-screen capable of receiving and displaying information related to the game. The value input device may include any device that can accept value or a wager from a customer, such as a card reader or an optical currency collector. The value input device may be integrated with external devices, such as a cash register or other retail terminals, to exchange information necessary to receive and record the wagering transaction. The player may also draw from a player's account with the lottery 14. The lottery ticket printer may be used to print or otherwise encode lottery tickets with information selected or required to play the lottery game. The printer may provide lottery tickets that reflect a player's selections, or complete lottery slips if the selection was generated automatically by the terminal.

A lottery ticket 20 may be used to initiate the game. One embodiment of a ticket includes any manner of indicia that advertises, describes, illustrates, or in any way presents aspects of the particular lottery game to a player 22. The lottery ticket 20 may include a game component that is completely independent of the network-based game. For example, the lottery ticket may implement an instant-win game wherein players play a scratch-off game in the game area. As is well known, typical scratch-off games include game indicia and prize award indicia that are covered by a removable coating. The player removes the coating to reveal whether or not the ticket represents a win or loss. It should be appreciated that this invention is not limited by any particular type of additional game component implemented by the ticket, and that the scratch-off game described is for representative purposes only.

A game playing and viewing system according to one embodiment of this invention may include a number of components for performing specific functions. The components may include, for example, storage components for data structures for storing game variations, present game session information, game session history, and win history. A game playing and viewing system may also include components used to access the payment and payout data structures.

One exemplary format for a lottery game and associated method of operation according to this invention is called Photo Lotto 100 herein. Aspects of such an exemplary game are disclosed in US Published Patent Application Nos. 2013/0260857 and 2013/0012288, each of which is hereby incorporated by reference in its entirety.

The Photo Lotto game 100 format (see FIGS. 5-6) offers three ways to win according to one embodiment:
  A. A match game where a player can win immediately at the retail site and an amount up to a rolling matching prize that starts at $50,000.
  B. A weekly drawing where a player can enter a picture for a chance to win up to $50,000.
  C. A weekly TV show where a player can compete for the top prize of $1,000,000.

A player 22 may purchase an entry at a regular lottery retailer for $5. The player 22 may play and win the match game immediately and at the same time enter his/her picture for a chance to be on the TV show and the weekly drawing via his/her smart phone 28, computer 30, electronic device or otherwise online.

Each such ticket 20 may be printed through a regular lottery terminal 24 or self-service terminal and it offers two games: the match game and the weekly photo drawing.

The match game offers an easy TIC-TAC-TOE play style in one embodiment according to this invention. The player 20 wins by matching three numbers to three "Photo numbers" in a row or by matching all "Photo numbers". All numbers are randomly generated and the ticket 20 cannot be canceled. The player 20 wins immediately and there is no need to wait for a drawing.

The match game may have four winning tiers and all prizes (but the rolling matching prize) can be redeemed at the retail site or point of purchase. The rolling matching prize starts at $50,000 and increases real-time with sales in one embodiment of this invention. The rolling prize can be updated at a regular interval, such as every 3-5 minutes, and can be advertised both on the printed tickets and the lottery monitors inside the lottery retailer site (on the PADs—Player Advertising Displays). On average, it is expected that there may be as many as one hundred top winners per week across a multi-jurisdictional format (i.e., nationwide for the whole US) and each winner may realize on average $100,000.

In total, every week it would be expected that 1,114,100 players would win a total of $24,732,687 in prizes. In addition, one could expect the rolling prize to increase by about $990 every two minutes based on the above described example of one embodiment of this invention.

Each jurisdiction 14 may have the opportunity to individualize its payout structure by adding prize tiers and changing payout percentages as long as the jurisdiction allocates the same amount as other jurisdictions to the top rolling jackpot 34. In one embodiment of this invention, each jurisdiction follows the same dynamic grid pool replenishment scheme.

Figure 5:
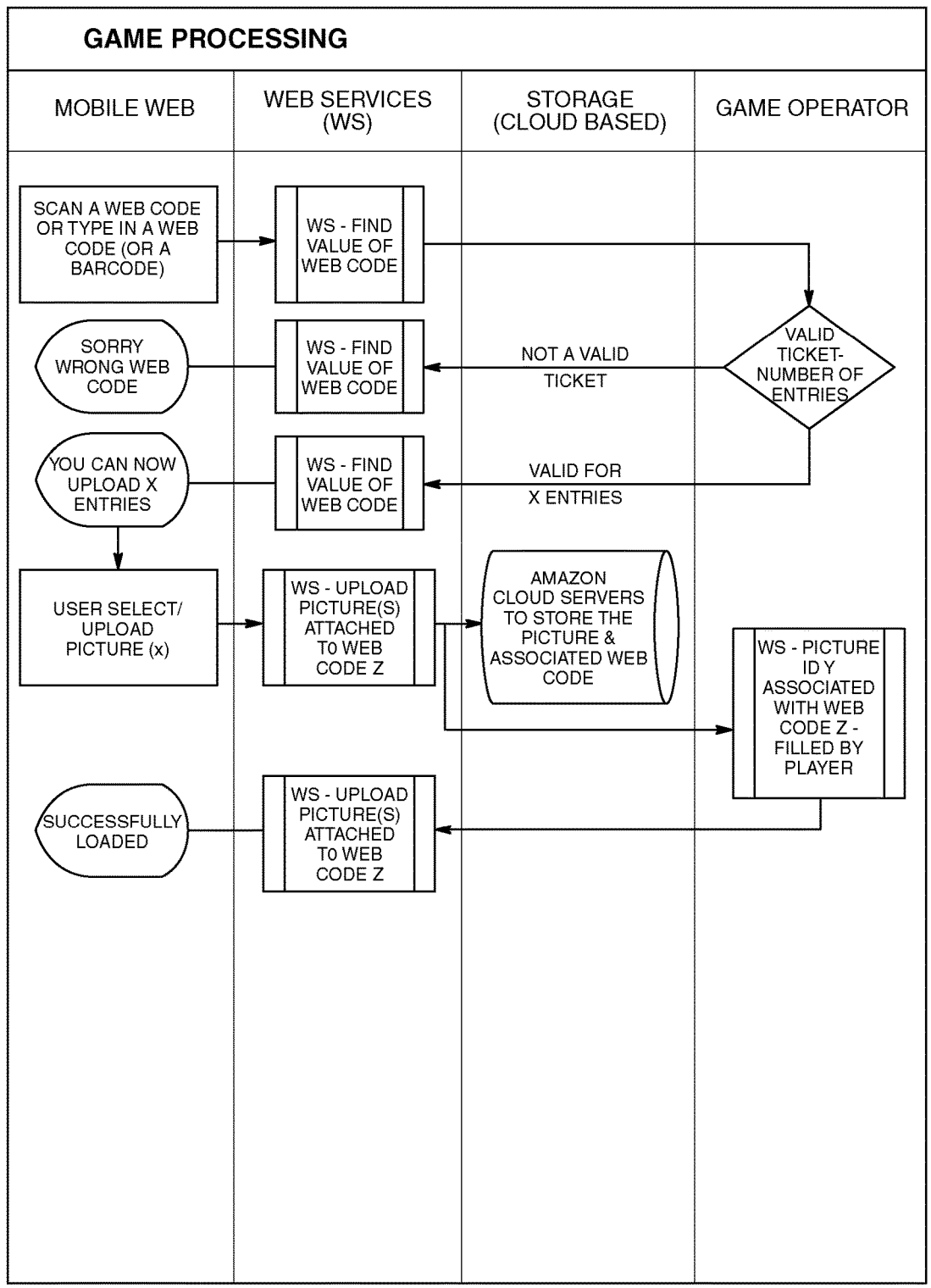
FIG. 5 is a flow chart of one embodiment of lottery game processing according to this invention.
Figure 6:
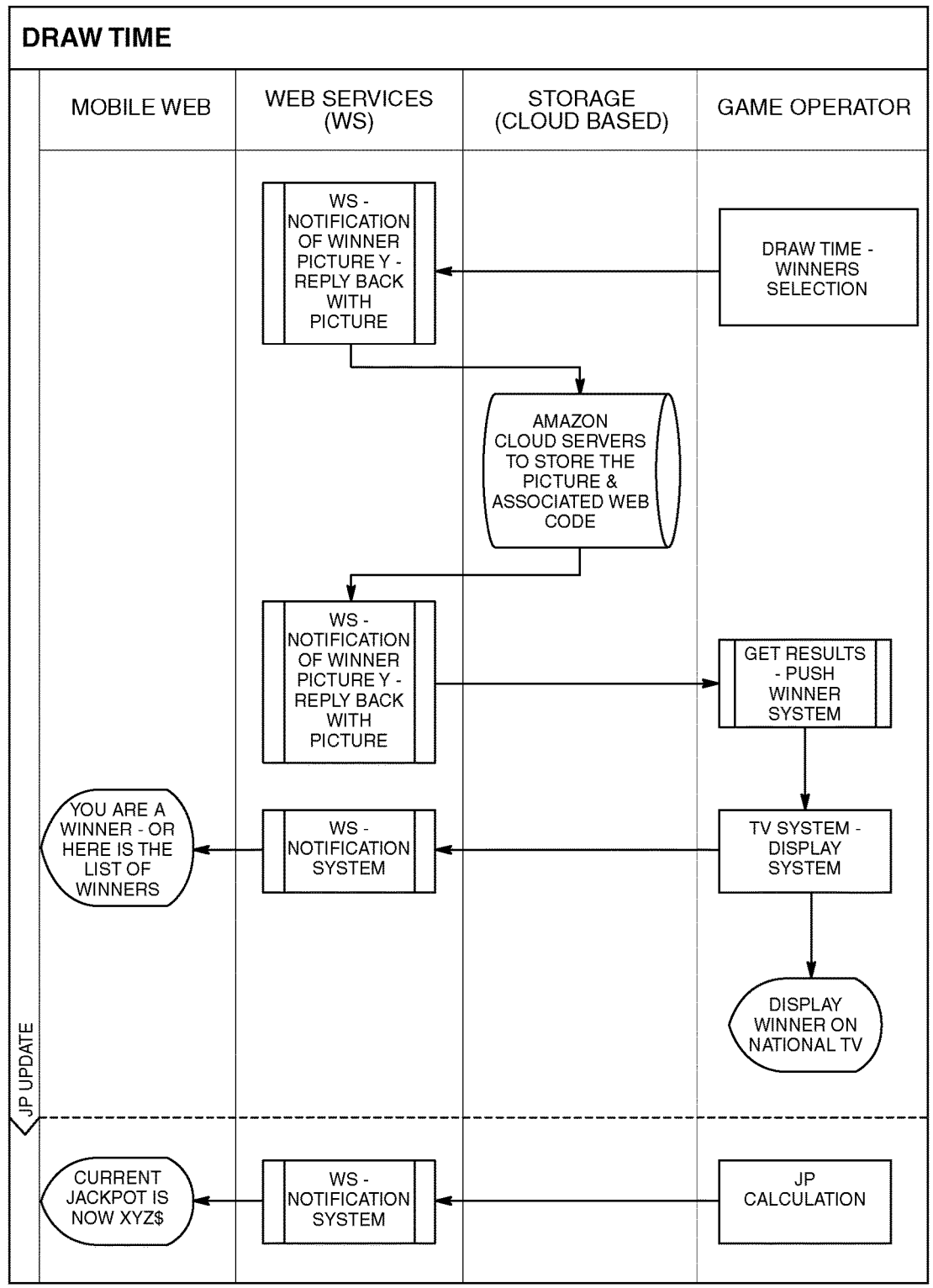
FIG. 6 is a flow chart of one embodiment of a lottery game drawing process and jackpot (JP) management according to this invention.

Referring to FIG. 5, the player 22 may enter his/her picture for the weekly drawing either via his/her Smartphone, online or another means according to this invention. The picture can be any picture that the player has taken with his/her phone or his/her account on Instagram or Facebook or the like. The picture doesn't need to be a picture of the player himself/herself, but it could also be a picture of their pets, their new manicure or their favorite motorcycle, etc. These pictures will not be sold or used in any other way than for purposes of the Photo Lotto game 100 according to aspects of this invention.

The player may download the Photo Lotto app on their phone and go through an easy basic registration process so as to allow the lottery jurisdiction(s) 14 to be able to contact them as needed in case of being a winner or other. The player can then upload his/her photo by either scanning the quick response (QR) code with the Photo Lotto app or by manually entering the code below the QR code. Each Photo Lotto ticket offers one photo entry to the weekly drawing in one embodiment of this invention.

The weekly Photo Lotto drawing may be incorporated into the weekly television (TV) show. Every week, 2-3 hours before the TV show starts, two hundred pictures out of the pool of all submitted pictures of that week may be randomly selected to be on the TV show. These are the two hundred pictures that may be pre-checked for inappropriate content for national TV. Entries will not be deleted, but inappropriate pictures may be changed to another image or the like.

At the beginning of the TV show, all two hundred pictures will appear in a big carousel. Out of those two hundred pictures, twenty-five are randomly selected to appear in a five by five (5×5) grid. All these twenty-five pictures are winners of the weekly drawing. As the game continues, pictures are randomly eliminated and at the end only one picture remains. That last picture wins $50,000 and each of the other remaining twenty four wins $5,000 (or $120,000 in total).

In addition, out of the initial two hundred pictures, the owners of three pictures may be randomly invited to participate on next week's TV show game.

Every week three contestants are invited to participate in the Photo Lotto Show (as described above). All expenses for travel, accommodation, etc. may be covered from the production company.

As described before, twenty five pictures are randomly selected for the first round of the game. All twenty five pictures may be displayed on a big screen in front of the contestants in a grid of five by five (5×5).

Each contestant may start the game with 1,000 Photo Money in their accounts. Each contestant is given an identifying color (red, blue and green). Each selected picture has now the color of its selector and the amount bet (please see below).

One contestant after the other (based on the initial random order) is asked to select one picture out of the twenty five until every contestant has selected five pictures each (fifteen pictures total). Each contestant is then asked to bet on the five selected pictures with portions of their photo money. Each contestant may bet on each potential photo and 100% of their money must be bet across the five potential outcomes. For example, a first player may decide to bet $200 in each of the five pictures while a second player may prefer to bet $500 on one picture and then $100 on each of the remaining four pictures.

When the betting is over, twenty pictures are randomly selected out of the twenty five. Each contestant gets to keep the money they bet on the selected pictures and loses the rest.

Twenty pictures are now left out of twenty five. Each contestant in the second round is now asked to bet their remaining money on five pictures. These pictures can be different to the ones that they chose during the first round.

Just like before, ten pictures are now randomly selected out of the remaining twenty. The contestants get to keep the money they bet on the selected pictures.

The third round is considered an elimination round in which ten pictures are now left out of twenty five. Each contestant is now asked to bet their remaining money on three pictures. These pictures can be different to the ones that they chose during the previous rounds.

Just like before, three pictures are now randomly selected out of the remaining ten. The contestants get to keep the money they bet on the selected pictures. If all three contestants survive this round, the one with the less money in their account is awarded third prize and the second with the second prize.

In the fourth round, only one player is still playing. Three pictures are now left out of twenty five. The contestant is now playing either for the first prize of $100,000 or the big $1 million prize. In order for the player to win that big prize, they need to guess which picture it is going to be randomly selected. At the same time, the last picture to be selected is the big winner of the Photo Lotto weekly drawing.

CONCLUSION

The Brief Summary and Abstract sections may set forth one or more but not all example embodiments and thus are not intended to limit the scope of embodiments of the invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of embodiments of the invention that others can, by applying knowledge within the skill of the art, readily modify and/or adapt for various applications such specific embodiments, without undue experimentation, without departing from the general concept of embodiments of the invention. Therefore, such adaptation and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the invention should not be limited by any of the above-described example embodiments, but should be defined only in accordance with the following claims and their equivalents.

What is claimed is:

1. A system for continuously updating a plurality of state servers each associated with a different jurisdiction as to a status of a multi-jurisdictional lottery game participated in by a plurality of different jurisdictions, comprising:
   at least one processor; and
   a memory coupled with the at least one processor, the memory including instructions that, when executed by the at least one processor cause the system to:
     receive, from the plurality of state servers, lottery data associated with lottery tickets purchased in the different jurisdictions, wherein the lottery data provides information indicative of a price and a time of purchase of each of the lottery tickets;
     sequence the lottery tickets based on their times of purchase across the different jurisdictions;
     determine, sequentially for each lottery ticket, a common jackpot at the time the lottery ticket was purchased for the multi-jurisdictional lottery game so that the common jackpot includes a running total accumulated from a percentage of the price of each lottery ticket purchased;
     monitor each state server to determine when a winning lottery ticket is identified in any of the different jurisdictions;
     notify each state server of an updated common jackpot amount each time a period of time expires, the period of time being reset each time it expires so that notifications occur repeatedly; and
     notify each state server when the winning lottery ticket is identified, thereby resetting the common jackpot to a minimum jackpot amount.

2. The system of claim 1, wherein the instructions further cause the system to:
    notify each state server associated with each different jurisdiction of the updated common jackpot amount in near real-time as the lottery tickets are purchased in each of the different jurisdictions; and
    notify each state server associated with each different jurisdiction when the winning lottery ticket is identified in any of the different jurisdictions in near real-time as the winning lottery ticket is identified, thereby resetting the common jackpot to the minimum jackpot amount.

3. The system of claim 2, wherein the instructions further cause the system to:
    notify each state server with each different jurisdiction of the updated common jackpot amount within 60 seconds from each previous notification as the lottery tickets are purchased in each of the different jurisdictions; and
    notify each state server associated with each different jurisdiction when the winning lottery ticket is identified within 60 seconds from each previous notification, thereby resetting the common jackpot to the minimum jackpot amount.

4. The system of claim 1, wherein the instructions further cause the system to:
    prevent participants from purchasing the lottery tickets without being updated as to the updated common jackpot amount when purchasing the lottery tickets by providing each state server associated with each different jurisdiction the updated common jackpot amount within the period of time.

5. The system of claim 1, wherein the instructions further cause the system to:
    prevent multiple participants from purchasing the winning lottery ticket before the period of time expires, thereby triggering the different jurisdictions to provide each of the multiple participants with the winning lottery ticket for the common jackpot by updating each state server associated with each different jurisdiction when the winning lottery ticket is identified within the period of time.

6. The system of claim 1, wherein the instructions further cause the system to:
    identify the winning lottery ticket when notified by the state server of the corresponding jurisdiction that the winning lottery ticket is purchased based on a position of the winning lottery ticket in the sequence relative to any other winning lottery ticket that is determined as purchased in any other jurisdiction.

7. A method for continuously updating a plurality of state servers each associated with a different jurisdiction as to a status of a multi-jurisdictional lottery game participated in by a plurality of different jurisdictions, comprising:
    receiving, from the plurality of state servers, lottery data associated with lottery tickets purchased in the different jurisdictions, wherein the lottery data provides information indicative of a price and a time of purchase of each of the lottery tickets;
    sequencing the lottery tickets based on their times of purchase across the different jurisdictions;
    determining, sequentially for each lottery ticket, a common jackpot at the time the lottery ticket was purchased for the multi-jurisdictional lottery game so that the common jackpot includes a running total accumulated from a percentage of the price of each lottery ticket purchased;
    monitoring each state server to determine when a winning lottery ticket is identified in any of the different jurisdictions;
    notifying each state server of an updated common jackpot amount each time a period of time expires, the period of time being reset each time it expires so that notifications occur repeatedly; and
    notifying each state server when the winning lottery ticket is identified, thereby resetting the common jackpot to a minimum jackpot amount.

8. The method of claim 7, wherein the notifying comprises:
    notifying each state server associated with each different jurisdiction of the updated common jackpot amount in near real-time as the lottery tickets are purchased in each of the different jurisdictions; and
    notifying each state server associated with each different jurisdiction when the winning lottery ticket is identified in any of the different jurisdictions in near real-time as the winning lottery ticket is identified, thereby resetting the common jackpot to the minimum jackpot amount.

9. The method of claim 8, wherein the notifying further comprises:
    notifying each state server associated with each different jurisdiction of the updated common jackpot amount within 60 seconds from each previous notification as the lottery tickets are purchased in each of the different jurisdictions; and
    notifying each state server associated with each different jurisdiction when the winning lottery ticket is identified within 60 seconds from each previous notification, thereby resetting the common jackpot to the minimum jackpot amount.

10. The method of claim 7, further comprising:
    preventing participants from purchasing the lottery tickets without being updated as to the updated common jackpot amount when purchasing the lottery ticket by providing each state server associated with each different jurisdiction the updated common jackpot amount within the period of time.

11. The method of claim 7, further comprising:
    preventing multiple participants from purchasing the winning lottery ticket before the period of time expires, thereby triggering the different jurisdictions to provide each of the multiple participants with the lottery ticket the common jackpot by updating each state server associated with each different jurisdiction when the winning lottery ticket is identified within the period of time.

12. The method of claim 7, further comprising:
    identifying the winning lottery ticket when notified by the state server of the corresponding jurisdiction that the winning lottery ticket is purchased based on a position of the winning lottery ticket in the sequence relative to any other winning lottery ticket that is determined as purchased in any other jurisdiction.

13. A system for conducting a multi-jurisdictional lottery game, comprising:
    at least one processor; and
    a memory coupled with the at least one processor, the memory including instructions that when executed by the at least one processor cause the system to:
        establish a minimum jackpot amount for the multi-jurisdictional lottery game, wherein the minimum jackpot amount is an initial amount of a common jackpot that is claimed by a selected winner from a plurality of participants located in a plurality of jurisdictions each associated with a corresponding state server of a plurality of state servers;

coordinate with the plurality of jurisdictions regarding a plurality of individual jurisdictional lottery games each being conducted within one of the plurality of jurisdictions in which the plurality of lottery players each participate in one of the individual jurisdictional lottery games in one of the jurisdictions by purchasing a lottery chance at a lottery game price, wherein the individual jurisdictional lottery game of a first jurisdiction differs from the individual jurisdictional lottery game of a second jurisdiction within the multi-jurisdictional lottery game by at least one of the following characteristics: game theme, odds, payout, random generation of winning symbols, dividends and tiers;

receive, from the plurality of state servers, lottery data associated with lottery tickets purchased in the jurisdictions, wherein the lottery data provides information indicative of a price and a time of purchase of each of the lottery tickets;

sequence the lottery tickets based on their times of purchase across the jurisdictions;

determine, sequentially for each lottery ticket, the common jackpot at the time the lottery ticket was purchased for the multi-jurisdictional lottery game so that the common jackpot includes a running total accumulated from a percentage of the price of each lottery ticket purchased;

communicate to each of the plurality of jurisdictions an updated common jackpot amount;

receive a notification from at least one state server associated with at least one of the jurisdictions that a potential winning jackpot player has won the multi-jurisdictional lottery game;

determine whether the potential winning jackpot player has won the multi-jurisdictional lottery game and a jackpot amount that the potential winning jackpot player is awarded based on characteristics associated with a jurisdiction associated with the potential winning jackpot player as compared with the characteristics associated with each other jurisdiction;

notify each of the state servers associated with each of the plurality of jurisdictions that the multi-jurisdictional lottery game has been won.

14. The system of claim 13, wherein the instructions further cause the system to:
re-establish the common jackpot at the minimum jackpot amount.

15. The system of claim 13, wherein the instructions further cause the system to:
repeat the communication to each of the plurality of jurisdictions the updated common jackpot amount repeatedly at a regular and predetermined time interval.

16. A method for conducting a multi-jurisdictional lottery game, comprising:
establishing, by a multi-jurisdictional master controller, a minimum jackpot amount for the multi-jurisdictional lottery game, wherein the minimum jackpot amount is an initial amount of a common jackpot that is claimed by a selected winner from a plurality of participants located in a plurality of jurisdictions;

coordinating, by the multi-jurisdictional master controller, with a plurality of individual jurisdictional lottery games each being conducted within one of the plurality of jurisdictions in which the plurality of lottery players each participate in one of the individual jurisdictional lottery games in one of the jurisdictions by purchasing a lottery chance at a lottery game price, wherein the individual jurisdictional lottery game of a first jurisdiction differs from the individual jurisdictional lottery game of a second jurisdiction within the multi-jurisdictional lottery game by at least one of the following characteristics: game theme, odds, payout, random generation of winning symbols, dividends, and tiers;

receiving, by the multi-jurisdictional master controller from the plurality of state servers, lottery data associated with lottery tickets purchased in the jurisdictions, wherein the lottery data provides information indicative of a price and a time of purchase of each of the lottery tickets;

sequencing, by the multi-jurisdictional master controller, the lottery tickets based on their times of purchase across the jurisdictions;

determining, by the multi-jurisdictional master controller sequentially for each lottery ticket, the common jackpot at the time the lottery ticket was purchased for the multi-jurisdictional lottery game so that the common jackpot includes a running total accumulated from a percentage of the price of each lottery ticket purchased;

communicating, by the multi-jurisdictional master controller, to each of the plurality of jurisdictions an updated jackpot amount;

receiving, by the multi-jurisdictional master controller, a notification from at least one state server associated with at least one of the jurisdictions that a potential winning jackpot player has won the multi-jurisdictional lottery game;

determining, by the multi-jurisdictional master controller, whether the potential winning jackpot player has won the multi-jurisdictional lottery game and a jackpot amount that the potential winning jackpot player is awarded based on characteristics associated with a jurisdiction associated with the potential winning jackpot player as compared with the characteristics associated with each other jurisdiction; and notifying, by the multi-jurisdictional master controller, each of the state servers associated with each of the plurality of jurisdictions that the multi-jurisdictional lottery game has been won.

17. The method of claim 16, further comprising:
re-establishing the common jackpot at the minimum jackpot amount.

18. The method of claim 16, further comprising:
repeating the communication to each of the plurality of jurisdictions the updated jackpot amount repeatedly at a regular and predetermined time interval.

* * * * *